(12) United States Patent
Hoshiba et al.

(10) Patent No.: US 6,220,904 B1
(45) Date of Patent: Apr. 24, 2001

(54) IGNITION TIMING CONTROL FOR MARINE ENGINE

(75) Inventors: Akihiko Hoshiba; Kazuhiro Nakamura, both of Hamamatsu (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/111,821

(22) Filed: Jul. 8, 1998

(30) Foreign Application Priority Data

Jul. 8, 1997 (JP) .................................................. 9-182589

(51) Int. Cl.$^7$ .................................................. B63H 21/21
(52) U.S. Cl. .......................................... 440/1; 123/406.52
(58) Field of Search .................... 440/84, 87, 1; 123/406.52

(56) References Cited

U.S. PATENT DOCUMENTS

| | | | |
|---|---|---|---|
| 3,935,845 | * 2/1976 | Aono et al. | 123/406.52 |
| 4,104,998 | * 8/1978 | Fenn | 123/406.52 |
| 4,492,198 | 1/1985 | Okumura . | |
| 4,606,315 | 8/1986 | Tobinaga et al. . | |
| 4,790,279 | 12/1988 | Tobinaga et al. . | |
| 4,889,095 | * 12/1989 | Sogawa | 123/418 |
| 4,901,696 | 2/1990 | Sakamoto et al. . | |
| 4,986,239 | 1/1991 | Oishi . | |
| 5,070,840 | 12/1991 | Kanno et al. . | |
| 5,105,785 | * 4/1992 | Okuda | 123/406.52 |
| 5,172,669 | 12/1992 | Nakamura . | |
| 5,176,117 | 1/1993 | Motose et al. . | |
| 5,219,398 | 6/1993 | Nonaka et al. . | |
| 5,222,470 | * 6/1993 | Oonuma et al. | 123/339 |
| 5,329,902 | 7/1994 | Sakamoto et al. . | |
| 5,450,828 | 9/1995 | Sakamoto et al. . | |
| 5,476,426 | 12/1995 | Nakamura et al. . | |
| 5,579,736 | 12/1996 | Nakamura et al. . | |
| 5,582,149 | 12/1996 | Kanno . | |
| 5,653,208 | 8/1997 | Nakamura . | |
| 5,678,519 | 10/1997 | Nakamura . | |
| 5,699,766 | 12/1997 | Saito . | |
| 5,715,793 | 2/1998 | Motose . | |
| 5,722,370 | 3/1998 | Koike et al. . | |

* cited by examiner

Primary Examiner—Sherman Basinger
(74) Attorney, Agent, or Firm—Knobbe, Martens, Olson & Bear, LLP (57) ABSTRACT

The present invention is an ignition control system controlling ignition firing timing of an ignition element associated with an engine having an output shaft powering a water propulsion device, an intake system including a throttle valve, and a sensor providing an output signal corresponding to each revolution of the output shaft. The ignition control system calculates a base ignition firing timing from a time between successive previous output signals, determines if a condition of engine acceleration or deceleration exists from a rate of change in the throttle valve position and modifies the basic ignition firing timing based on a condition of engine acceleration or deceleration.

29 Claims, 6 Drawing Sheets

Figure 6 ns of the ignition control. In addition, where the engine speed is rapidly fluctuating, the estimate of the future engine condition may vary substantially from the actual engine condition at the time the firing signal is actually output.

An engine control is desired which overcomes the above-stated problems and which provides for smooth transition of the watercraft to and from a planed condition is desired.

IGNITION TIMING CONTROL FOR MARINE ENGINE

FIELD OF THE INVENTION

The present invention is an ignition timing control for a marine engine.

BACKGROUND OF THE INVENTION

Watercraft are often powered by an inboard or outboard motor. The motor includes a water propulsion device, such as a propeller, which is powered by an internal combustion engine. The engine has an output shaft which drives the water propulsion device.

Figure 6:
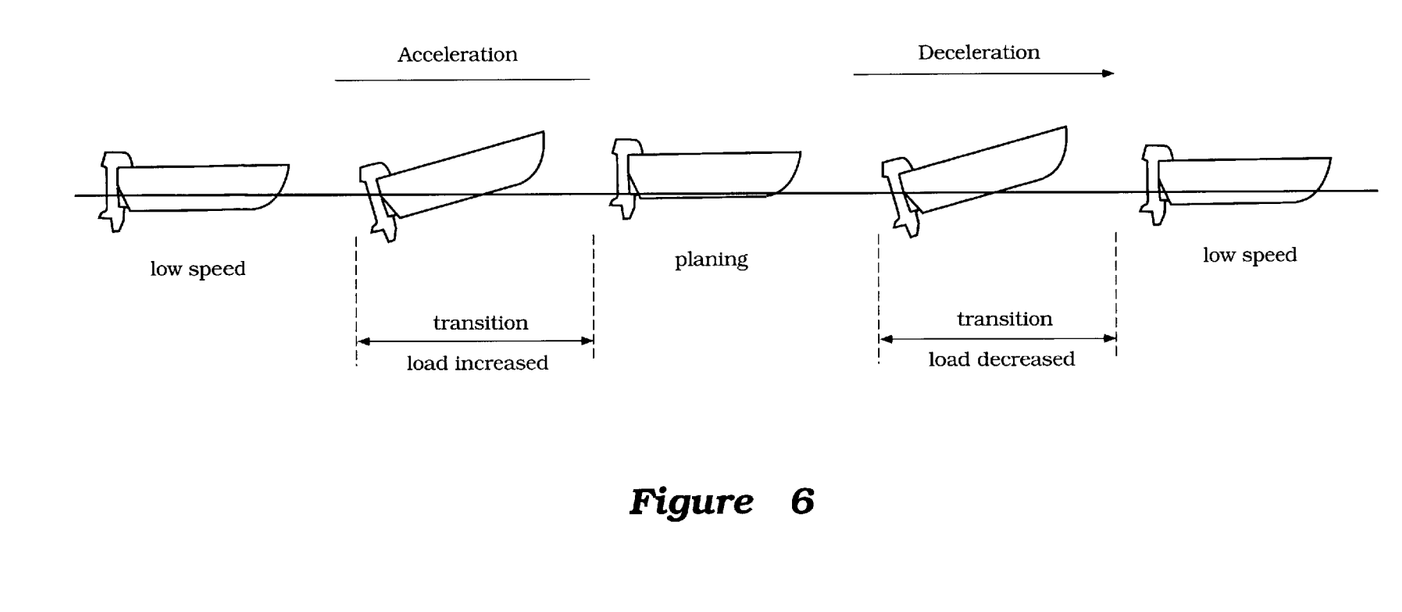
FIG. 6 illustrates the condition of a watercraft powered by an engine, the watercraft moving between a low speed or trolling condition, a planed condition and back to a low speed condition.

In the "planing-type" watercraft, the watercraft moves from a position low in the water at a low speed to a position high in the water at a higher speed. When the watercraft is accelerated from the low speed position to the planing position, a large load is placed upon the engine. After the watercraft has moved to a planing condition, less of the watercraft contacts the water, reducing associated drag. This arrangement is illustrated in FIG. 6.

Figure 5A:
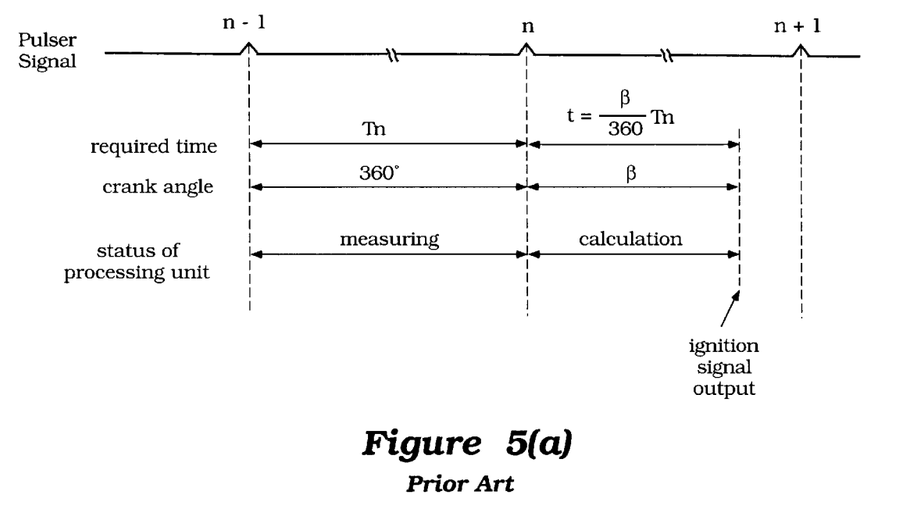
FIG. 5(a) is a diagram illustrating an ignition timing control in accordance with the prior art operated during an engine steady-speed condition.
Figure 5B:
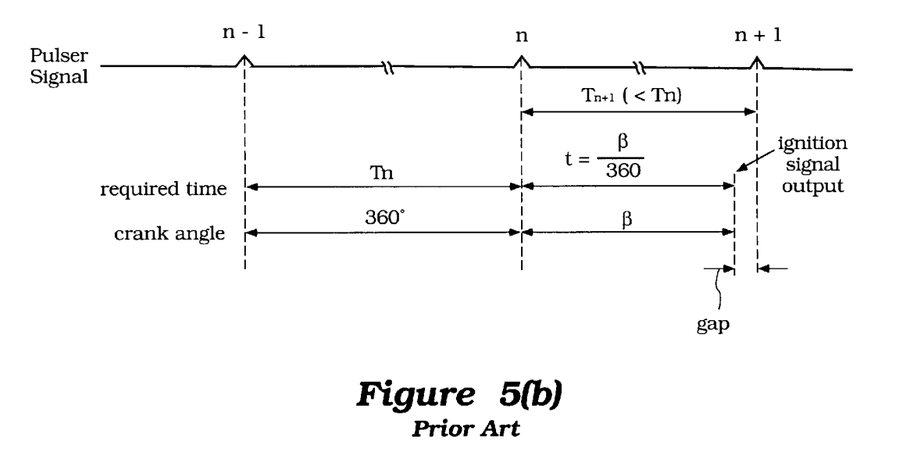
FIG. 5(b) is a diagram illustrating an ignition timing control in accordance with the prior art operated during a condition of engine acceleration.

An ignition arrangement associated with an engine powering such a watercraft is illustrated in FIG. 5(a). An output signal is received from a mechanism which provides a signal dependent upon the speed of the engine. Generally, the output signal is generated by a pulser coil associated with the rotating crankshaft of the engine. In this arrangement, time Tn is the time between successive output signals and represents the time it takes for the crankshaft to complete one revolution.

The ignition elements associated with the engine are fired at a firing time obtained from a map based on engine speed. At least one ignition element is fired at a time corresponding to crank angle β. Since the crank angle is not known exactly at all times, the position β is estimated by determining the time t it takes for the crankshaft to rotate to position β at the speed of the engine. The ignition control calculates time t based on time Tn, and then outputs the appropriate firing signal.

In the situation where the engine speed is relatively steady, as in FIG. 5(a), this arrangement is fairly suitable. Where the engine speed is rapidly changing, such as in the case where the engine speed is accelerating to move a watercraft from a low speed to a planing position, this method of calculating the firing timing is detrimental. In particular, when the engine speed increases, the time Tn during each successive interval (i.e. Tn, Tn+1, Tn+2) becomes successively shorter. Therefore, if the firing timing for the next interval is calculated based on the time from the previous interval, the ignition firing timing is much too late as compared to the desired firing timing. Conversely, if the engine speed reduces quickly, the firing timing interval is based on a time which is too short compared to the next interval, and the firing timing is advanced in relation to the desired or optimum firing timing.

During the transition of the watercraft to a planing condition, the firing timing delay results in a loss in power, slowing the speed of watercraft planing. Conversely, when the watercraft moves from a planed to a low speed condition and the load decreases, the firing timing advance results in an unnecessarily high reduction in engine speed.

As one method to overcome the above-stated problem, the ignition timing may be calculated by estimating the rate of change in engine speed from two successive crankshaft rotations. This arrangement, however, slows the responsive-

SUMMARY OF THE INVENTION

The present invention is an ignition control system arranged to control the firing timing of an ignition element associated with an engine. Preferably, the engine is of the type having an output shaft powering a water propulsion device.

The engine includes an intake system including a throttle valve. A sensor provides an output signal corresponding to each revolution of the output shaft.

The ignition control system calculates a base ignition firing timing from a time between successive previous output signals. The ignition control system then determines if a condition of engine acceleration or deceleration exists from a rate of change in the throttle valve position and modifies the basic ignition firing timing based on a condition of engine acceleration or deceleration.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention relates to an ignition system of an engine. Preferably, the ignition system is associated with an engine used in a marine application, such as for powering an outboard motor. The invention comprises an ignition timing control for such an ignition. Those of skill in the art will appreciate that the ignition system of the present invention may be used with engines adapted for use in other applications.

Figure 1:
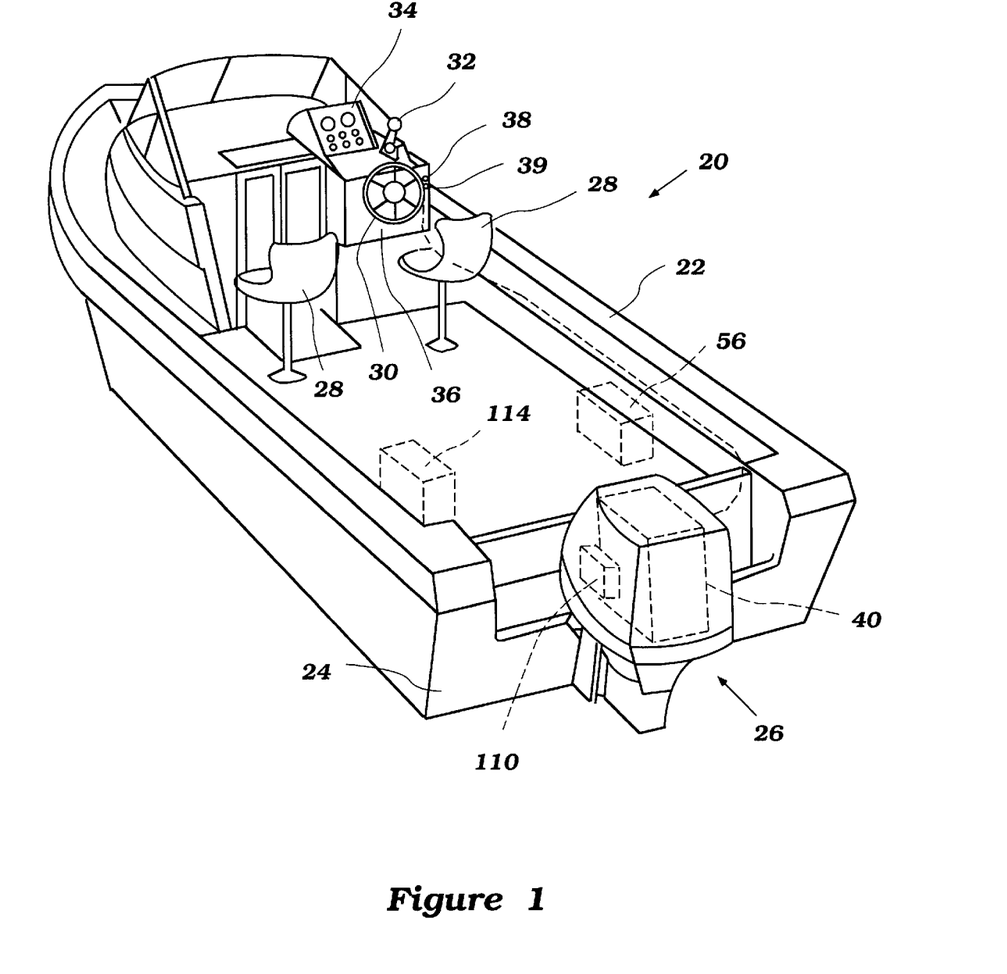
FIG. 1 is a perspective view of a watercraft propelled by an outboard motor.

Referring to FIG. 1, there is illustrated a watercraft 20. The watercraft 20 illustrated is a power boat, but may comprise any number of other types of crafts. The watercraft 20 has a hull 22 with a transom portion 24 to which is mounted an outboard motor 26. The outboard motor 26 is utilized to propel the watercraft 20. As known to those skilled in the art, the motor 26 may also be of the inboard type. As illustrated in FIG. 6, the watercraft 20 is preferably of the type which can be moved from a low speed or trolling position to a higher speed planed condition.

When of the outboard variety, the motor 26 is connected to the watercraft 20 in a manner which allows it to pivot up and down in a vertical plane ("trimming") and rotate left and right in a horizontal plane ("steering") in a manner well known to those skilled in the art.

The watercraft 20 illustrated includes a pair of seats 28. One of the seats 28 is preferably positioned near a steering wheel 30. The steering wheel 30 is connected remotely to the outboard motor 26 for effectuating movement of the motor left and right for steering the craft. Additionally, a throttle control such as a handle, 32 is preferably positioned near the steering wheel 30 for use in controlling the speed of the watercraft 20 by changing the speed of the engine powering the motor 26 (as described below).

Preferably, this handle 32 simultaneously serves as a shift control lever for controlling the position of a transmission 74 associated with the motor 26 and as a throttle control. In general, such a control is arranged so that in one position of the handle 32, the transmission 74 is set to neutral and the engine to an idle speed, in a range of positions the transmission 74 is moved to a forward drive position and the engine may be operated from idle to a high speed, and in yet another range of positions the transmission 74 is moved to a reverse drive position and the engine may again be operated between an idle speed and a high speed.

A control panel 34 is preferably provided near the steering wheel 30, the control panel 34 having one or more gauges, meters or other displays for displaying various information to the user of the watercraft 20. These displays may display watercraft speed and the like. A switch panel 36 is also provided near the steering wheel 30. The switch panel 36 preferably includes one or more switches or controls, such as a main switch 38 and a kill switch 39.

Referring still to FIG. 1, the motor 26 has a water propulsion device, such as a propeller (not shown) which is powered by an engine 40. The engine 40 is preferably mounted within a cowling of the motor 26. Of course, the engine 40 may be of the "inboard" variety as known to those in the art.

The engine 40 may be arranged in a variety of configurations, such as in-line, "V" or opposed, may operate on a two or four-cycle principle, and be of the rotary, reciprocating piston or other type. Preferably, the engine 40 has four cylinders (and thus four combustion chambers) each having a piston reciprocally mounted therein and attached to a crankshaft and operates on a four cycle principle. The engine 40 is oriented within the cowling so that the crankshaft is generally vertically extending and in driving relation with the water propulsion apparatus of the motor 26.

Figure 2:
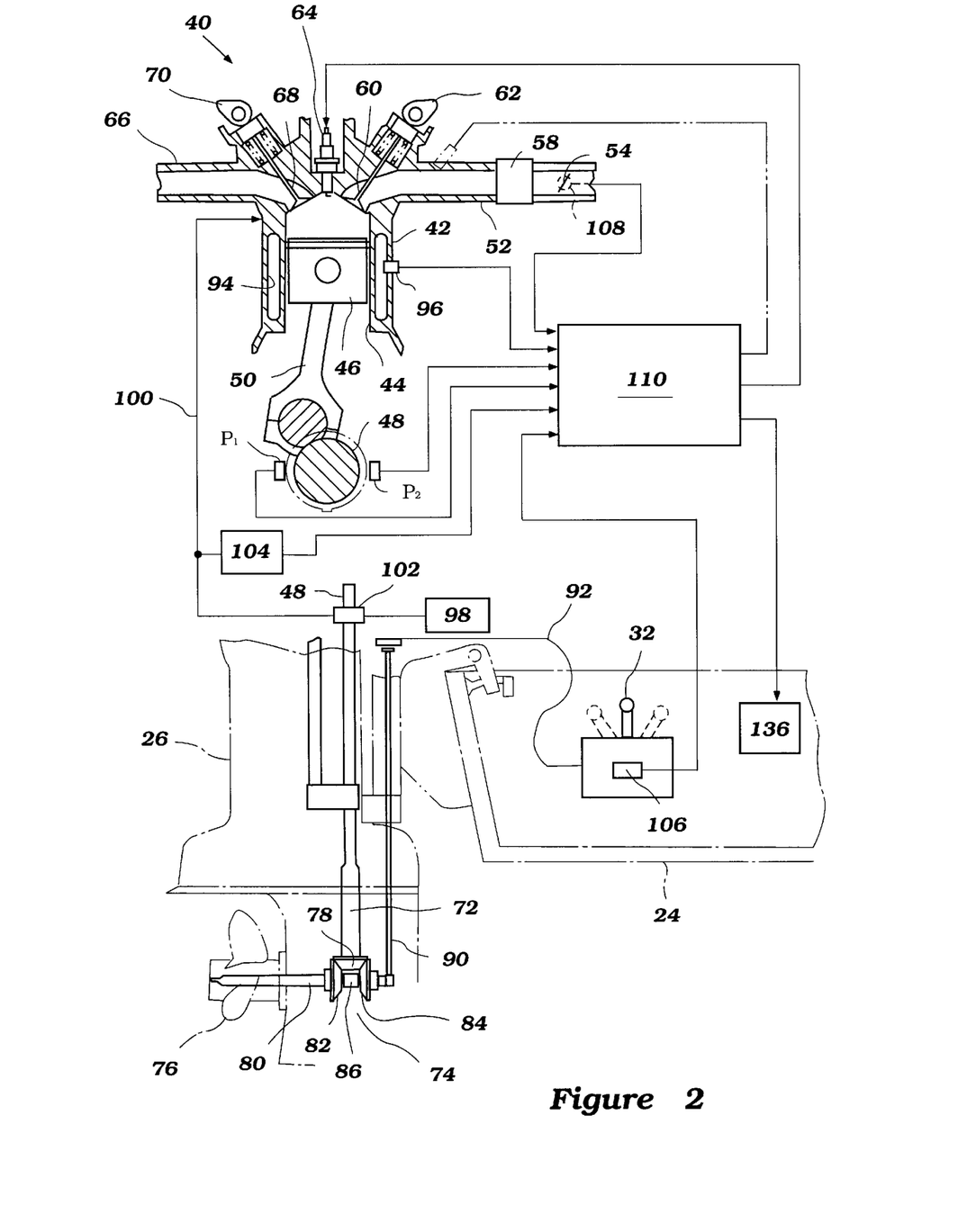
FIG. 2 is a schematic illustrating the interrelationship of an engine of the motor, a transmission of the motor, and an igniting timing control in accordance with the present invention.

The outboard motor 26, including the engine 40, will be described in more detail with reference to FIG. 2. As illustrated, the engine 40 has a body 42 which defines the cylinders 44. A piston 46 is reciprocally mounted in each cylinder 44. The piston 46 is connected to a crankshaft 48 with a connecting rod 50. A combustion chamber is defined above the piston 46 in the cylinder 44.

Air is supplied to the combustion chamber through an intake system which includes an intake pipe 52. The intake pipe 52 leads from an air intake to the combustion chamber. A throttle valve 54 is arranged to control the air flow through the intake pipe 52. Preferably, the throttle valve 54 comprises a plate which is rotatably mounted in the intake pipe 52. The throttle valve 54 is moveable to a first position in which it is closed or generally closed for operating the engine 40 at an idle speed, and an open position in which the speed of the engine 40 is high. As described above, the position of the throttle valve 54, and thus the speed of the engine 40, is preferably controlled remotely by the operator of the watercraft 20 with the handle 32 through an appropriate linkage.

A fuel system supplies fuel for combustion with the air in the combustion chamber. The fuel system includes a fuel supply, such as a fuel tank 56 mounted in the watercraft 20. The fuel system delivers fuel from the supply to one or more charge formers. As illustrated, the charge former comprises a carburetor 58 associated with the intake pipe 52 and arranged to deliver fuel into the air passing through the intake pipe 52. As illustrated, a separate intake pipe 52 and carburetor 58 are provided for each cylinder 44. Common intake pipes and carburetors may be used for all cylinders 44, however, as is known. Preferably, the rate of fuel delivery by the carburetor is governed by the throttle control which also controls the throttle valve 54. Of course, the fuel may be supplied with one or more fuel injectors or other charge formers.

The flow of air and fuel into the combustion chamber is regulated in a timed manner with an intake valve 60. This valve 60 selectively opens and closes the passage leading into the combustion chamber as controlled by a camshaft 62 or similar mechanism.

As described in detail below, combustion of the air and fuel mixture in the combustion chamber is initiated with a spark plug 64 or other ignition device. The spark plug 64 is controlled with an ignition timing system in accordance with the present invention.

The products of combustion are routed from the combustion chamber to a point external to the outboard motor 26 through an exhaust system. This exhaust system includes an exhaust passage leading from the combustion chamber to an exhaust pipe 66. An exhaust valve 68 controls the flow of exhaust to the exhaust pipe 66 in a timed manner. As with the intake valve 60, the exhaust valve 68 is preferably controlled by a camshaft 70 or similar mechanism. The exhaust is routed from the exhaust pipe 66 to a point external to the motor 26.

The intake and exhaust camshafts 62,70 may be driven by the crankshaft 48 of the engine 40, by separate motors or in other manners well known to those of skill in the art. In addition, the intake and exhaust camshafts may comprise a single common camshaft.

The crankshaft 48 of the engine 40 is preferably vertically extending and is arranged to drive a drive shaft 72. The drive shaft 72 selectively drives the water propulsion device of the motor 26 through a transmission 74. As illustrated, the water propulsion device comprises a propeller 76.

A drive gear 78 is mounted on the drive shaft 72. A forward gear 82 and reverse gear 84 associated with the transmission 74 and mounted on a common shaft 80 to the propeller 76 may be moved into selective engagement with the drive gear 78 with a dog clutch 86. The transmission 74 is also arranged so that neither the forward or reverse gears 82,84 engage the drive gear 78 (i.e. a neutral position).

As illustrated, the transmission 74 is controlled with a shift rod 90. The shift rod 90 is controlled by the shift/throttle lever 32 mounted in the watercraft 20 via a control cable 92 or other linkage.

Though not illustrated in detail, the engine 40 preferably includes a liquid cooling system. This system includes means, such as a pump, for supplying coolant from a coolant supply to one or more water jackets 94. Preferably, the cooling system is arranged to draw water from the body of water in which the watercraft 20 is operating for use as the coolant in the cooling system.

A lubricating system provides lubricant to various portions of the engine 40. This system includes a lubricant or oil supply, such as in a reservoir 98 and means for delivering the lubricant from the supply through one or more passages 100. In the arrangement illustrated, the means for delivering comprises an oil pump 102 which is driven directly by the crankshaft 48.

A variety of sensors are associated with the motor 26. Preferably, a temperature sensor 96 is associated with the one of the water a jackets 94 for sensing the temperature of the coolant therein. An oil pressure sensor or switch 104 monitors the pressure of the lubricant in the lubricating system. A shift position switch 106 monitors the position of the shift/throttle handle 32. A throttle valve position sensor 108 monitors the throttle valve 54 position or angle θ.

The output from these various sensors is preferably provided to an ignition timing control 110 in accordance with the present invention. The ignition timing control is used to control an ignition system which is used to initiate combustion of the air and fuel mixture supplied to each combustion chamber.

As described above, this ignition system includes at least one spark plug 64 associated with each cylinder 44. Where the engine 40 has four cylinders 44, as described above, there are four spark plugs, a first 64-1 corresponding to a first cylinder, a second 64-2 corresponding to a second cylinder, a third 64-3 corresponding to a third cylinder, and a fourth 64-4 corresponding to a fourth cylinder. As described in more detail below, a firing mechanism is associated with the spark plugs 64 for inducing a spark across a gap each spark plug 64 in order to initiate ignition of the fuel and air mixture within a combustion chamber or cylinder.

Figure 3:
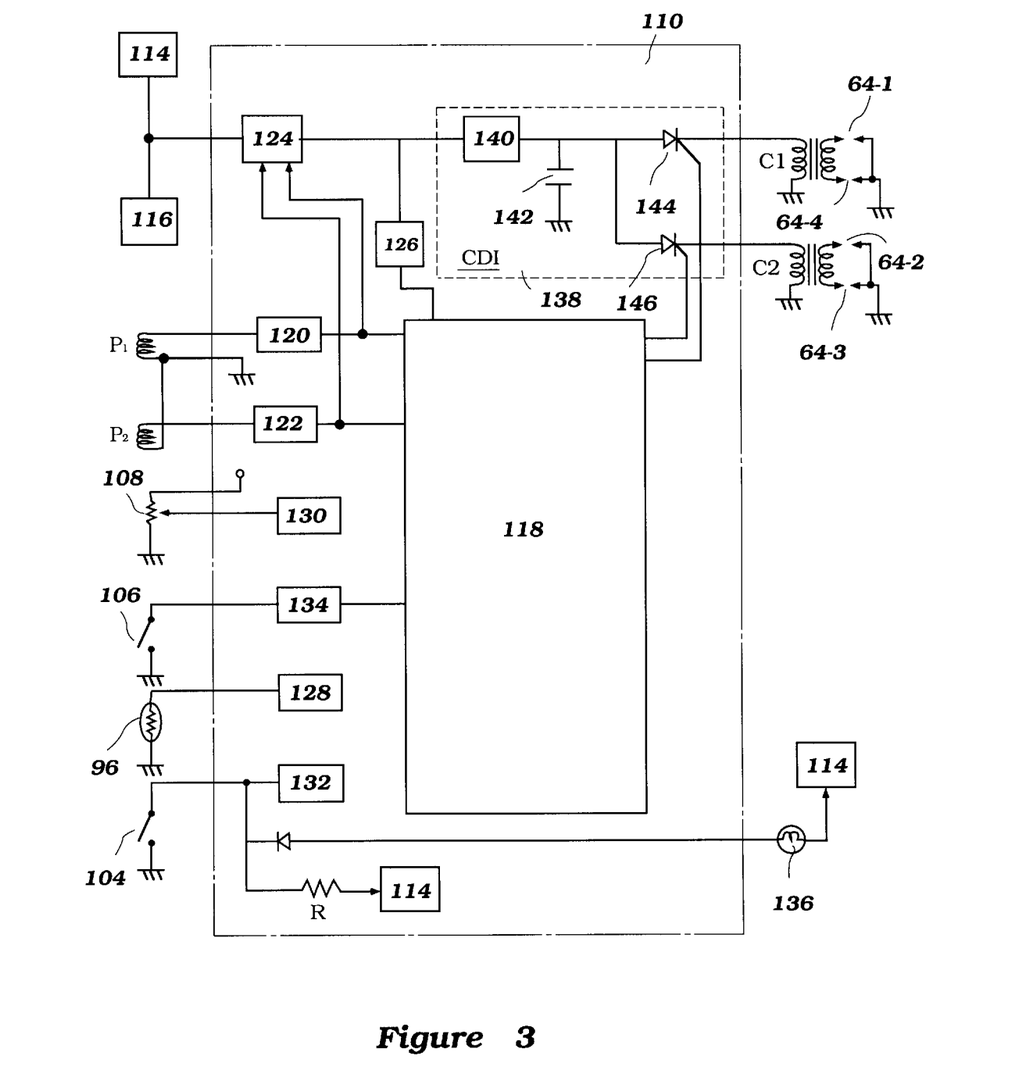
FIG. 3 is a circuit diagram of an electrical system of the outboard motor illustrated in FIG. 1, the electrical system including the ignition timing control in accordance with the present invention.

FIG. 3 illustrates an electrical system associated with the watercraft 20. The electrical system includes the ignition timing control 110 of the present invention.

The electrical system includes a base or primary power supply. This base power supply preferably comprises a battery 114. As illustrated in FIG. 1, the battery 114 may be conveniently mounted in the watercraft 20.

Referring again to FIG. 3, the electrical system 46 also includes a secondary power supply. This power supply comprises an alternating current generator 116 associated with the engine 40. The generator 116 is preferably driven by the crankshaft 48 of the engine 40. Either the battery 114 or generator 116 provides power to the ignition timing control 110. Though not illustrated, the kill and main switches 38,39 are preferably arranged to selectively permit or prevent power from flowing from these power sources to the ignition timing control 110.

First and second pulser coils P1,P2 are used to generate and output a timing signal. Each pulser coil P1,P2 provides an output signal or spike at a specific time dependent upon engine speed, such as when a member mounted on a flywheel of the engine 40 passes by a pick-up element (see FIG. 2).

In this arrangement, the first pulser coil P1 provides an ignition timing signal corresponding to the spark plugs 64-1,64-4 corresponding to the first and fourth cylinders 44, while the second pulser coil P2 provides such a signal corresponding to the spark plugs 64-2,64-3 corresponding to the second and third cylinders 44. The output of the pulser coils P1,P2 is provided to a computer processing unit (CPU) 118 of the ignition timing control 110 through a respective input circuit 120,122.

Power is provided to the CPU 118 through a non-contact type switch 124 through a constant voltage circuit 126.

The temperature sensor 96 associated with the cooling system outputs temperature data to the CPU 118 through an input circuit 128. Likewise, the output of the throttle valve position from the throttle position sensor 108, the output of the oil pressure switch 104, and the output of the shift position sensor 106 all pass through appropriate input circuits 130,132,134 to the CPU 118.

When insufficient oil pressure is sensed by the switch 104, an alarm or lamp 136 is activated. A load or resistance R is associated with the alarm or lamp circuit, as is well known. The alarm or lamp 136 is preferably mounted at or near the control panel 34 of the watercraft 20.

The ignition system includes a capacitor-discharge ignition (CDI) circuit 138. This circuit 138 includes a control 140 which is powered and which is arranged to control the charging of a charging condenser 142.

The spark plugs 64-1,64-4 corresponding to the first and fourth cylinders 44 are associated with a first ignition coil C1. The spark plugs 64-2,64-3 corresponding to the second and third cylinders are associated with a second ignition coil C2.

The first ignition coil C1 is linked through a first circuit to the charging condenser 142, and the second ignition coil C2 is inked through a similar second circuit. The CDI circuit 138 includes a first thyristor 144 positioned along the first circuit, and a second thyristor 146 is positioned along the second circuit. Both thyristors 144,146 are controlled by an output signal from the CPU 118. When the CPU 118 sends an appropriate ignition signal to either of the thyristors 144,146, they open and current is allowed to flow from the condenser 142 through the first or second circuit to the first or second ignition coil C1,C2, at which time a spark is induced at the spark plugs corresponding thereto.

Those of skill in the art will appreciate that in the four-cycle engine, each cycle comprises seven-hundred and twenty degrees of crankshaft rotation. In one three-hundred and sixty-degree rotation, each piston moves from top dead center downwardly to bottom dead center in an induction mode, then moves back to top dead center for combustion. In the next three-hundred and sixty degree cycle the piston moves downwardly as driven by the expanding combustion gasses, and then moves upwardly back to top dead center in an exhaust sequence.

In the engine arranged as described above, the pistons corresponding to a pair of cylinders (such as the first and fourth cylinders) are generally in the same position, but three-hundred and sixty degrees apart in the operating cycle. In other words, when the piston corresponding to the first cylinder is at top dead center for combustion, the piston corresponding to the fourth cylinder is also at top dead center but in the exhaust sequence. Likewise, the second and third cylinders are so interrelated.

In the arrangement of the present invention, the spark plugs 64-1,64-4 corresponding to the first and fourth cylinders are fired at the same time. The firing of the spark plug corresponding to cylinder which is in the combustion portion of the cycle is effective in initiating combustion, while the simultaneous firing of the spark plug corresponding to the other cylinder is ineffective since it is in exhaust mode. Thus, in each firing of both pairs of spark plugs 64-1/64-4 and 64-2/64-3 only one of the firings is "effective" or "actual" in the sense that it initiates combustion. Of course, the ignition system of the engine 40 may be arranged so that the ignition elements are fired independently.

Certain features of the CPU 118 of the ignition timing control 110 will be described in greater detail with reference next to FIG. 4. As illustrated, the CPU 118 preferably includes a cylinder disabling control portion 150, an engine speed calculating portion 152, an ignition timing map portion 154, an acceleration/deceleration ignition timing compensation part or portion 156, an ignition timing calculation portion 158, and an ignition signal output portion 160. These portions of the CPU 118 may be integrated into a single circuit or chip.

The output of the cooling system temperature sensor 96 and oil pressure switch 104 are provided to the cylinder disabling control portion 150. In the event the engine overheats or insufficient oil pressure exists, the cylinder disabling control portion 150 is preferably arranged to provide an ignition timing signal which prevents the firing of the spark plugs 64 corresponding to one or more of the cylinders 44. This ignition signal is supplied to the ignition signal output portion 160 and thereon to the thyristors 144,146.

The output of the pulser coils P1,P2 is provided to the engine speed computation portion 152, which determines the engine speed from the output of the pulser coils P1,P2. The engine speed is provided to the ignition timing map portion 154 for providing base ignition timing data. This timing data is provided to the ignition timing calculation portion 158 which calculates the final ignition timing based on the output from the map, the pulser coils P1,P2, and an output signal from the acceleration/deceleration ignition timing compensation portion 156. The final ignition timing signals (except when overridden by the disabling portion 150) are output to the thyristors 144,146 through the ignition signal output portion 160 of the CPU 118.

The output of the throttle valve position sensor 108 is provided to the acceleration/deceleration ignition timing compensation portion 156, as is the engine speed. The acceleration/deceleration ignition timing compensation portion 156 determines if the engine speed is increasing or decreasing and in certain instances is arranged to output an ignition timing compensation signal to the ignition timing calculation part 158.

Figure 4:
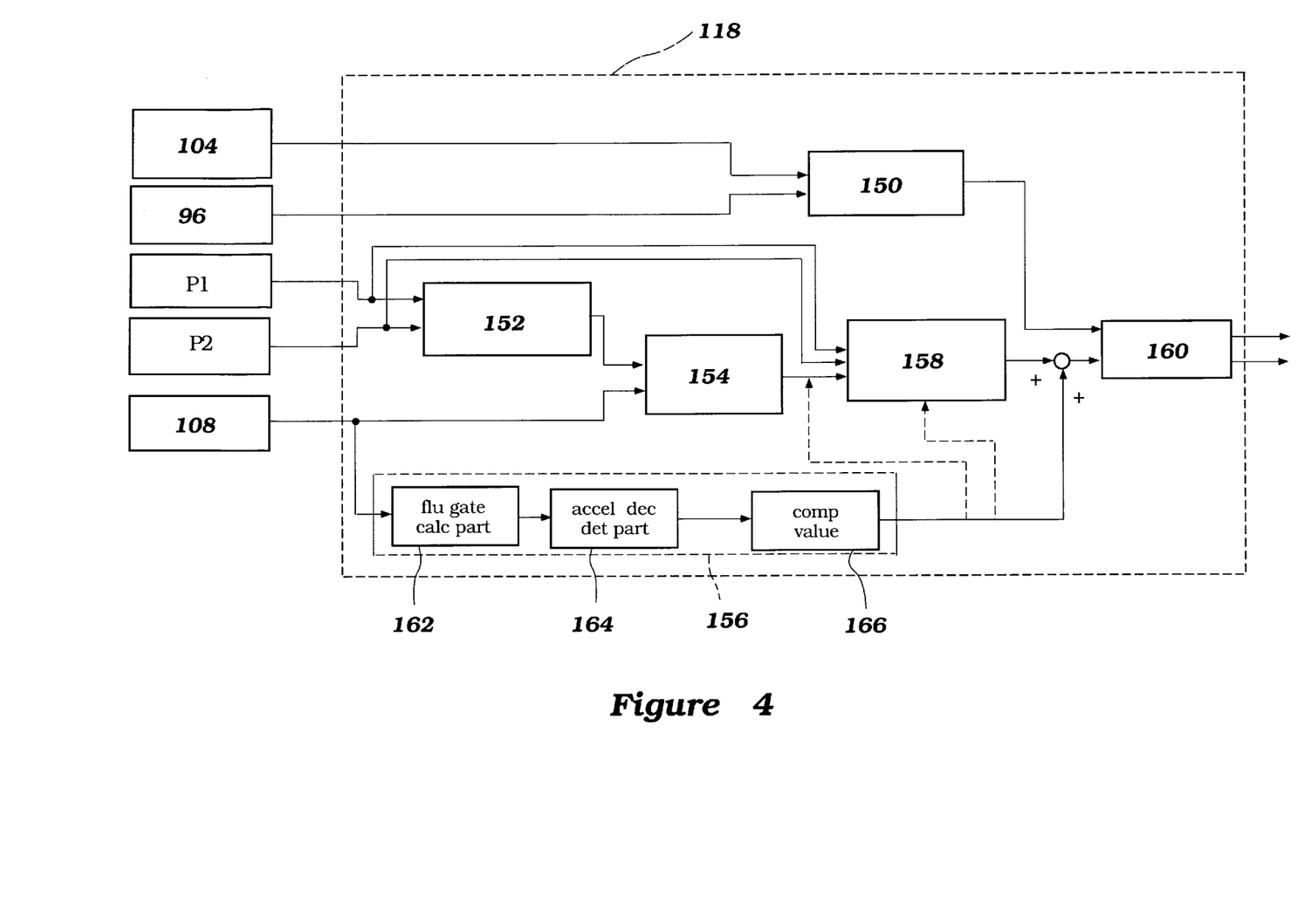
FIG. 4 is a diagram illustrating in greater detail a processing unit of the igniting timing control of the present invention.

Still referring to FIG. 4, the acceleration/deceleration ignition timing compensation portion 156 comprises a fluctuation rate calculation part 162, an acceleration/deceleration determining part 164, and an ignition timing compensation part 166. The output of the throttle valve position sensor 108 is provided to the fluctuation rate calculation part 162. Based on the amount of change in the throttle valve 54 position over time, the acceleration/deceleration determining part determines if the engine speed is increasing or decreasing, and at what rate.

Based on the speed of engine acceleration or deceleration, a compensated ignition timing signal is provided to the igniting timing calculation part 158. The igniting timing calculation part 158 modifies the ignition timing signal obtained from the map based on the compensation timing to provide an igniting firing timing which accommodates the changing engine speed.

If the engine speed is accelerating, the basic ignition timing is advanced (i.e., the firing timing is earlier than the regular firing timing). If the engine speed is decelerating, the basic ignition timing is delayed (i.e., the firing timing is later than the regular firing timing). Of course, the amount of compensated delay or advanced is dependent upon the detected rate of acceleration or deceleration.

Advantageously, the changes in ignition firing timing are made based on change in engine speed as determined from a change in throttle valve position. Since changes in engine speed lag the changes in throttle position, this permits the ignition control to provide a compensated ignition firing timing signal at or before the engine speed changes, and not after, as in the case of the systems of the prior art.

Of course, the foregoing description is that of preferred embodiments of the invention, and various changes and modifications may be made without departing from the spirit and scope of the invention, as defined by the appended claims.

What is claimed is:

1. An engine powering a water propulsion device, said engine comprising an intake system comprising a throttle valve adapted to regulate the rate of air flow through said intake system to said engine, said engine also comprising an ignition control, means for detecting changes in throttle valve position and means for providing a series of output signals based on a speed of said engine, said ignition control comprising means for determining a basic ignition firing timing signal based on said speed of said engine as determined by the time between a previous pair of said series of output signals, said ignition control further comprising means for adjusting said basic ignition firing timing signal based on a condition of engine acceleration or deceleration detected from a change in throttle valve position.

2. An engine in accordance with claim 1 further comprising means for determining a rate of acceleration or deceleration from a rate of change in throttle valve position.

3. An engine in accordance with claim 2, wherein said means for adjusting is arranged to advance said basic ignition firing timing signal an amount corresponding to said rate of acceleration if a condition of engine acceleration exists.

4. An engine in accordance with claim 2, wherein said means for adjusting is arranged to delay said basic ignition firing timing signal an amount corresponding to said rate of deceleration if a condition of engine deceleration exists.

5. An engine in accordance with claim 2, wherein said water propulsion device propels a planing-type watercraft.

6. An engine in accordance with claim 2, wherein said engine is of the four-cycle type.

7. A method of controlling ignition firing timing of an ignition element associated with an engine having an output shaft powering a water propulsion device, an intake system comprising a throttle valve, and a sensor providing an output signal corresponding to each revolution of said output shaft, said method comprising the steps of calculating a base ignition firing timing from an interval between a pair of output signals, said base ignition firing timing corresponding to said interval, determining if a condition of engine acceleration or deceleration exists from a change in said throttle valve position and modifying said basic ignition firing timing based on a condition of engine acceleration or deceleration.

8. The method in accordance with claim 7 further comprising advancing said basic firing timing if said engine speed is accelerating.

9. The method in accordance with claim 7 further comprising delaying said basic firing timing if said engine speed is decelerating.

10. The method in accordance with claim 7, wherein modifying said basic ignition firing time comprises determining a degree of acceleration or deceleration from a rate of change in said throttle valve position and modifying said basic ignition firing timing based on said degree of engine acceleration or deceleration.

11. The method in accordance with claim 10 further comprising advancing said basic ignition firing timing if said engine speed is accelerating.

12. The method in accordance with claim 11, wherein said basic ignition firing timing is advanced less under slow acceleration and more under rapid acceleration.

13. The method in accordance with claim 10 further comprising delaying said basic ignition firing timing if said engine speed is decelerating.

14. The method in accordance with claim 13, wherein said basic ignition firing timing is delayed less under slow deceleration and more under rapid deceleration.

15. The method in accordance with claim 7, wherein said pair of output signals comprise successive output signals.

16. A method of adjusting ignition firing timing of an engine comprising evaluating engine speed based on an interval between output signals from an engine speed sensor, deriving a basic ignition firing timing based upon said evaluated engine speed, determining if the engine is accelerating or decelerating based on movement of a throttle valve, deriving a first or second compensation value based upon whether the engine is accelerating or decelerating, calculating an adjusted ignition firing timing by combining said basic ignition firing timing and said compensation value, and passing said adjusted ignition firing timing to an ignition signal output module.

17. The method of claim 16 further comprising determining a rate of engine acceleration or deceleration.

18. The method of claim 17, wherein a rate of engine acceleration or deceleration is determined by a rate of movement of the throttle valve.

19. The method of claim 17, wherein said compensation value corresponds to said rate of engine acceleration or deceleration.

20. The method of claim 19, wherein said adjusted ignition firing timing is advanced as compared to said basic ignition firing timing if said engine is accelerating.

21. The method of claim 19, wherein said adjusted ignition firing timing is delayed as compared to said basic ignition firing timing if said engine is decelerating.

22. The method of claim 16, wherein said ignition signal output module determines whether a malfunction of a cooling system or a lubrication system is occurring and interrupts said adjusted ignition firing timing in the event of said malfunction.

23. An engine comprising an intake pipe, a throttle valve positioned in said intake pipe, a throttle valve sensor adapted to indicate movement of said throttle valve, said engine further comprising an engine speed sensor and an ignition timing control, said ignition timing control being electrically connected to said engine speed sensor and to said throttle valve sensor, said ignition timing control comprising an ignition timing map portion, an ignition timing calculation portion, an acceleration/deceleration ignition timing compensation portion and an ignition signal output portion, said ignition timing map portion being electrically connected to said engine speed sensor and to said ignition timing calculation portion and said ignition timing map portion being interposed between said engine speed sensor and said ignition timing calculation portion, said acceleration/deceleration ignition timing compensation portion being adapted to output an adjustment signal in response to both acceleration and deceleration and being electrically connected to both said throttle valve sensor and to said ignition signal output portion, said ignition timing calculation portion outputting an ignition timing to said ignition signal output portion whereby said ignition timing and said adjustment signal are combined to control an ignition component associated with said engine.

24. The engine of claim 23, wherein said acceleration/deceleration ignition timing compensation portion comprises a rate of throttle valve change determining portion, an acceleration/deceleration determining portion and a compensation value determining portion, said acceleration/deceleration determining portion being interposed between said rate of throttle change determining portion and said compensation determining portion.

25. The engine of claim 23, wherein the engine speed sensor comprises a pulsar coil that emits a series of signal pulses in response to movement of a crankshaft of the engine.

26. The engine of claim 25, wherein the pulsar coil cooperates with a flywheel magneto to detect movement of said crankshaft.

27. The engine of claim 23, wherein said engine speed sensor is also directly electrically connected to said ignition timing calculation portion.

28. The engine of claim 23, wherein said acceleration/deceleration ignition timing compensation portion is directly electrically connected to said ignition timing calculation portion and said ignition timing calculation portion outputs an adjusted ignition signal to said adjusted ignition signal output portion.

29. The engine of claim 23, wherein said acceleration/deceleration ignition timing compensation portion is directly electrically connected to an electrical connection between said ignition timing map portion and said ignition timing calculation portion.

* * * * *